United States Patent [19]

Wilkerson

[11] Patent Number: 4,711,985

[45] Date of Patent: Dec. 8, 1987

[54] INTERFERENCE DETECTOR FOR LASER CUTTING MACHINE

[75] Inventor: James R. Wilkerson, Morrow, Ohio

[73] Assignee: Cincinnati Milacron Inc., Cincinnati, Ohio

[21] Appl. No.: 946,264

[22] Filed: Dec. 24, 1986

[51] Int. Cl.$^4$ .............................................. B23K 26/00
[52] U.S. Cl. ...................... 219/121 LB; 219/121 LG
[58] Field of Search ................. 219/121 LG, 121 LN, 219/121 LA, 121 LB, 121 LU, 121 LV, 121 LY, 124.34; 901/13, 42

[56] References Cited

U.S. PATENT DOCUMENTS

| 4,389,561 | 6/1983 | Weman et al. | 219/124.34 |
| 4,406,940 | 9/1983 | Tsutsumi | 219/121 |
| 4,540,869 | 9/1985 | Yasuoka | 219/124.34 |

Primary Examiner—C. L. Albritton
Attorney, Agent, or Firm—Thomas M. Farrell

[57] ABSTRACT

A coordinate laser cutting machine nozzle rides in close proximity to sheet material to be cut, and the nozzle is provided with an outer chambered ring, spring-loaded to ride on the sheet stock. The nozzle ring is provided with a concentric band of spring steel held in spaced relationship thereto by a plurality of standoffs. The spring ring is maintained at a spaced distance from the surface of the sheet stock, i.e. at the chamfer line, and the spring ring and outer nozzle ring are connected to an electrical supply. Upon contacting a dislodged workpiece previously-cut from the sheet stock, the spring ring makes electrical contact with the outer nozzle ring, and the resulting electrical signal is used for automatically inhibiting machine movement, or for otherwise indicating a fault condition.

3 Claims, 5 Drawing Figures

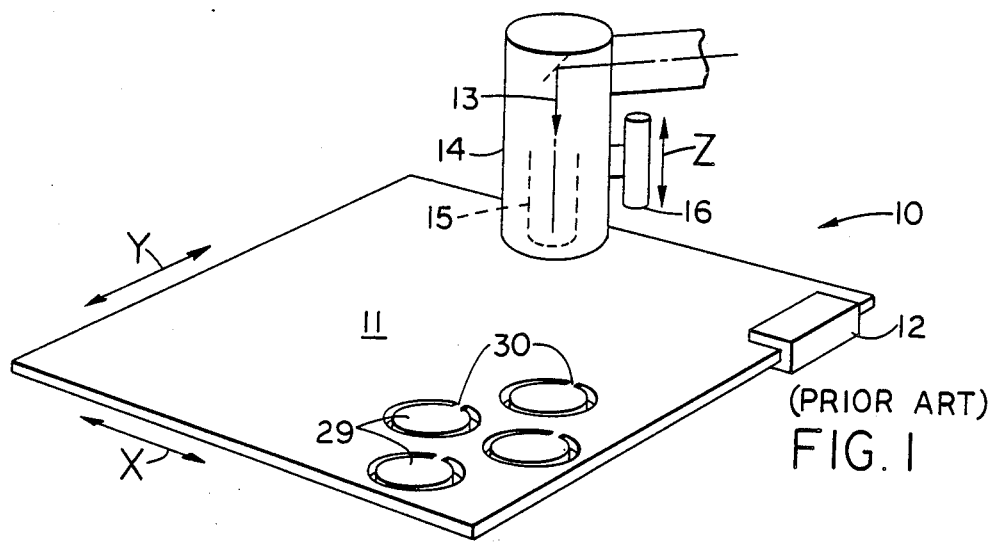
FIG. 1 (PRIOR ART)
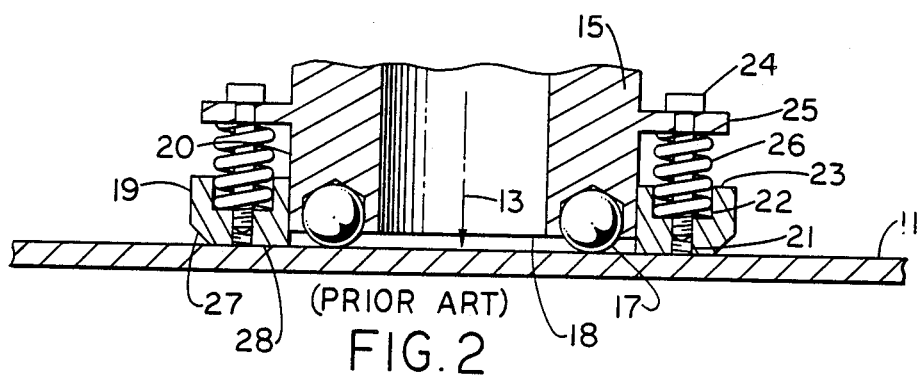
FIG. 2 (PRIOR ART)
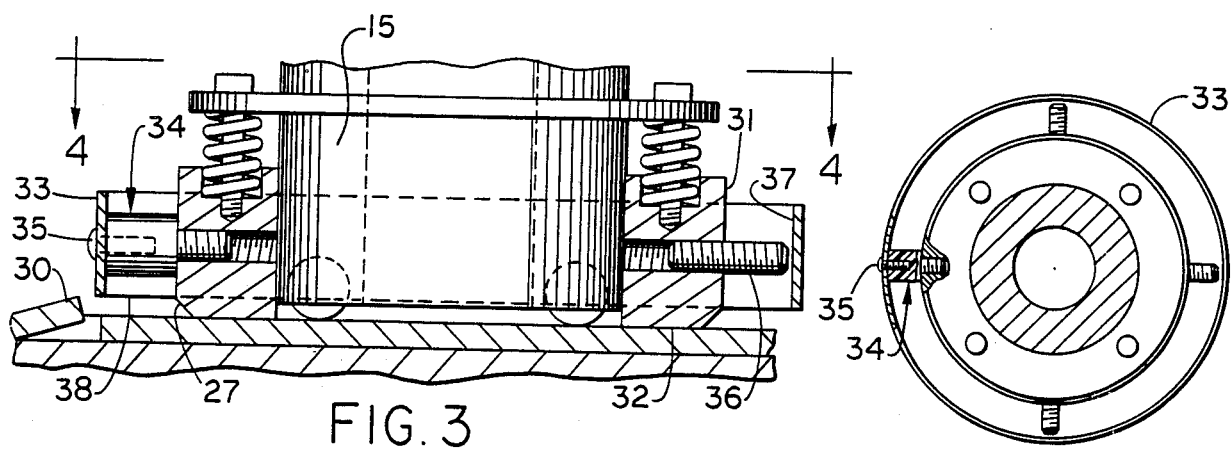
FIG. 3
FIG. 4
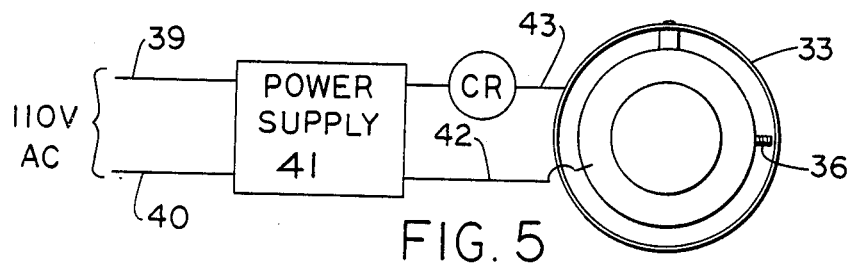
FIG. 5

4,711,985

INTERFERENCE DETECTOR FOR LASER CUTTING MACHINE

BACKGROUND OF THE INVENTION

The invention relates to laser cutting machines for producing parts from sheet stock, and the invention specifically relates to detection of interference between parts and the laser nozzle and the protection of the nozzle from possible damage.

In a coordinate laser cutting machine, the elements are in arrangement very similar to those of automatic coordinate punch presses for operating on sheet stock. Namely, sheet material is moved in response to a numerical control unit in a horizontal plane in X and Y directions and maneuvered beneath a cutting head. In a punch press, a die set is actuated in the vertical direction to blank parts out of the sheet stock. However, in laser cutting machine, a power laser beam is ducted through a light pipe system to a vertical nozzle and focus device to concentrate the beam on the workpiece material and scribe the shape. The nozzle is actuated in the vertical direction by an offset piston and is brought into proximity with the workpiece when it is desired to begin the lasing operation. In at least one prior art machine, the nozzle has a plurality of balls at its end face, which rest on the sheet stock. The nozzle is surrounded by a ring which rides on the sheet material surface, and is yieldably supported by the nozzle so that undulations and slight surface imperfections may ride underneath the ring as well. In the prior art device, the ring is provided with a chamfer about its external circumference so that a lead-in is provided for a surface imperfection or a previously cut workpiece which may be slightly disturbed from the plane of the sheet material.

It is known in lasing art to provide small tabs of uncut material, typically in the nature of 0.010 to 0.030 in. (0.2–0.8 mm) wide, which bind an essentially finished workpiece to the parent sheet stock until the sheet stock is removed from the machine. After such removal, the workpieces are easily taken from the sheet stock by breaking the tabs which retain the part in position.

Applicant has observed that, since the placement and number of tabs is generally an arbitrary process, in some cases it is possible for a workpiece to become jostled or tilted from the plane of the sheet stock and proceed along in this orientation towards the laser nozzle when another workpiece is to be cut out by the lasing head. In such case, if the rise of the disturbed workpiece is higher than the chamfer of the outer nozzle ring, jamming may take place which may result in undesirable several conditions: the laser nozzle may be crushed or disturbed from its alignment with the machine; or the entire sheet stock may be skewed and thrown into misalignment with the nozzle.

Applicant has obviated the difficulties inherent in the prior art device by an improved apparatus for controlling workpiece misalignment for parts cut from sheet stock on a lasing machine.

It is therefore an object of the present invention to provide apparatus for interference detection on a laser cutting machine.

SUMMARY OF THE INVENTION

The invention is shown embodied in a coordinate laser cutting machine utilizing a laser beam focusing unit and nozzle to direct a laser cutting beam normal to a workplane, wherein the machine supports sheet stock in the workplane. A protection device for the nozzle comprises a first contact element carried by the nozzle proximal to the sheet stock; a second contact element is carried by the nozzle proximal to the first contact element; means is provided for biasing the first and second elements away from each other; electric power means is connected to both the first and second elements for generating an electrical signal when said elements touch one another; and means responsive to said generated electrical signal is provided for automatically inhibiting machine movement when the contact elements touch one another.

BRIEF DESCRIPTION OF THE DRAWINGS

FIG. 1 is a schematic drawing of a coordinate laser cutting machine for machining parts from sheet material.

FIG. 2 is an elevational section through the laser nozzle of the prior art.

FIG. 3 is an elevational section through the laser interference detection device.

FIG. 4 is a plan view in partial broken away section of the laser interference detection device of FIG. 4.

FIG. 5 is a schematic of an electrical connection for the elements of FIGS. 4 and 5.

DESCRIPTION OF THE PREFERRED EMBODIMENT

Referring to FIG. 1 of the drawings, a coordinate laser cutting machine 10 is shown in diagrammatic form, in which sheet stock 11 to be worked on is typically clamped in a sheet clamp 12 and moved through an N.C. program in X and Y coordinate directions below a vertically aimed laser beam 13 in a well-known manner. The laser beam 13 passes through a focus unit 14 and nozzle 15 (in which gases may be supplied to condition the point of laser application). The nozzle 15 is positioned vertically by means of an offset positioning device such as a piston and cylinder unit 16, and, referring to FIG. 2, the nozzle 15 has a plurality of balls 17 seated in its lowermost face 18, so that the balls come 17 to rest on the sheet stock 11. Thus, an antifriction interface is had between the nozzle 15 and sheet stock 11, and the nozzle 15 is maintained at a predetermined distance from the surface of the sheet stock 11.

An outer nozzle ring 19 is situated on a close-fitting diameter 20 of the nozzle 15, and the ring 19 is generally flat faced, having a plurality of tapped holes 21 and counterbores 22 in its uppermost face 23. Screws 24 received through a flange 25 on the nozzle 15 serve to loosely retain the ring 19 with the nozzle 15, and a plurality of compression springs 26 are received in the counterbores 22 and are pressed against the nozzle flange 25 to bias the nozzle 15 and ring 19 away from one another. In this manner, therefore, the ring 19 is biased downward against the sheet stock 11, relative to the nozzle 15, yet the ring 19 is able to float and yield as surface imperfections and contaminants are encountered. The ring 19 is provided with a large chamfer 27 around its bottom face 28, typically 0.100 inch (2.5 mm) by 45°. The chamfer 27 provides a "lead-in" for surface imperfections as well as for previously-machined part shapes which may tend to become disturbed with sheet movements and thus rise above the upper surface of the sheet stock 11.

In FIG. 1, the workpieces 29, to be cut from the sheet stock 11, are outlined with the laser beam 13 to a point of near completion, while a small tab 30 of uncut material is maintained, to be broken away later when the sheet stock 11 is removed from the machine 10. The point of providing the tabs 30 is to provide some insurance that the workpieces 29 will, indeed, move in unison with the sheet stock 11 until all operations have been completed.

Referring to FIGS. 4, 5, and 6, the prior art assembly has been replaced with an inventive assembly, where the outer ring 31 of the nozzle 15 is manufactured from conductive material such as steel, having a bottom surface 32 which will wear in a suitable fashion while gliding over sheet stock 11, and the nozzle ring 31 is, in turn, provided with an outer spring ring 33 of thin, deflectable spring steel held in a concentric, spaced, relationship by a standoff 34. The standoff 34 is nonconductive and consist of a straight, circular body and a threaded portion received in the nozzle ring 31. A cap screw 35 passes through the outer ring 33 and is threadably received in the standoff 34 to maintain the relationship of the parts. A plurality of conductive screws 36 are adjustably positioned to a close gap with respect to the inner surface 37 of the spring ring 33.

The lowermost face 38 of the spring ring 33 is maintained at a gap from the top surface of the sheet stock 11, coinciding with the edge of the chamfer 27, so that the spring ring 33 will not make electrical contact with the nozzle ring 31 until a fault condition is detected.

With reference to FIG. 5, the outer spring ring 33 is deflectable from its normal circular shape upon external workpiece contact, whereupon the ring 33 will touch the conductive screw 36. FIG. 5 shows, schematically, that a pair of input electrical lines 39,40 are used to bring 110 volt AC power to a power supply unit 41 which, in turn, supplies 24 volt DC power to a pair of output electrical lines 42,43 connected respectively, to the outer nozzle ring 31 and the outer spring ring 33. The coil of a control relay, CR, is shown in one output line 43 and the relay contact (not shown) is used, for example, to shut down the machine 10 or alert the operator through annunciator means, upon workpiece interference fault detection.

A fault condition would arise when, in viewing FIG. 3, a previously-machined workpiece 30 could become tilted to such position that it would no longer be forced flat again by the lead-in of the nozzle ring chamfer 27; i.e. the part in the example provided, would tilt more than 0.100 inch (2.5 mm) up from the surface of the sheet stock 11. Should this condition arise, the spring ring 33 will become deflected and, functioning as a "circular safety switch" surrounding the nozzle 15, the fault condition will be indicated and appropriate response measures taken.

Here it should be noted that other shapes and materials may be provided for the conductive switch devices.

While the invention has been shown in connection with a preferred embodiment, it is not intended that the invention be so limited, but rather the invention extends to all such designs and modifications as come within the scope of the appended claims.

What is claimed is:

1. In a coordinate laser cutting machine having: means for supporting sheet stock in a work plane; a laser beam focusing unit and nozzle oriented to direct a laser cutting beam normal to said work plane, said nozzle being positionable proximal to said sheet stock; and means for moving said sheet stock in a plurality of directions along said work plane while said nozzle is positioned proximal to said sheet stock, a protection device for said nozzle, comprising:

a circular nozzle ring of conductive material, carried by said nozzle proximal to said sheet stock;

a deflectable circular spring ring of conductive material, concentrically affixed to said circular nozzle ring by at least one radial standoff, said circular spring ring biased to form a non-conductive gap between said circular nozzle ring and said circular spring ring;

electric power source means connected to said circular nozzle ring and said circular spring ring for generating an electric signal when said circular nozzle ring and said circular spring ring contact each other; and means responsive to said electric signal for automatically inhibiting machine movement when said circular nozzle ring and said circular spring ring contact each other.

2. The protection device of claim 1, wherein said circular nozzle ring has one end face proximally located to said sheet stock, and wherein said circular spring ring has a corresponding end face axially displaced from the nozzle ring end face, away from said sheet stock.

3. The protection device of claim 1, further comprising conductive screw means for adjustably varying said non-conductive gap.

* * * * *